United States Patent [19]

Kickuth et al.

[11] Patent Number: 4,793,929
[45] Date of Patent: Dec. 27, 1988

[54] METHOD FOR THE PURIFICATION OF SEWAGE WATERS

[76] Inventors: Reinhold W. Kickuth, Gilsbergstrasse 9, D-3436 Hess.-Lichtenau; Norbert Könemann, Mühlenstrasse 4, D-3527 Calden-Obermeiser, both of Fed. Rep. of Germany

[21] Appl. No.: 53,966
[22] Filed: May 26, 1987

[30] Foreign Application Priority Data

May 28, 1986 [DE] Fed. Rep. of Germany ....... 3618029

[51] Int. Cl.$^4$ .............................. C02F 3/30; C02F 3/32
[52] U.S. Cl. ..................................... 210/602; 210/605; 210/617; 210/630; 210/631; 210/903
[58] Field of Search ................................. 210/602-605, 210/629, 630, 747, 903, 614, , 617, 631, 170

[56] References Cited

U.S. PATENT DOCUMENTS

| | | | |
|---|---|---|---|
| 3,701,727 | 10/1972 | Kormonik | 210/629 X |
| 3,900,394 | 8/1975 | Rongred | 210/629 |
| 4,277,341 | 7/1981 | Wise et al. | 210/602 |
| 4,333,837 | 6/1982 | Plosz et al. | 210/602 |
| 4,415,450 | 11/1983 | Wolverton | 210/602 |
| 4,548,712 | 10/1985 | Reid | 210/194 |

FOREIGN PATENT DOCUMENTS

| | | |
|---|---|---|
| 347877 | 1/1979 | Austria . |
| 0170991 | 1/1986 | European Pat. Off. . |
| 2910015 | 9/1980 | Fed. Rep. of Germany . |
| 3011276 | 10/1981 | Fed. Rep. of Germany ...... 210/602 |
| 3508916 | 9/1986 | Fed. Rep. of Germany . |
| 61-82898 | 4/1986 | Japan ................................. 210/602 |

Primary Examiner—Tom Wyse
Attorney, Agent, or Firm—Laney, Dougherty, Hessin & Beavers

[57] ABSTRACT

With the method for the purification of sewage waters, in a first purification stage favorable conditions (pH, suspended matter) for the growth of ubiquiteous nitric bacteria are adjusted, whereby the loads of ammonia are to the major extent converted to nitrate. In a subsequent second purification stage in the form of a fixed mineral bed planted with emersed helophytes, the nitrate is reduced to nitrogen, and phosphate, sulfur, heavy metals and refractory carbon compounds are eliminated.

32 Claims, 3 Drawing Sheets

METHOD FOR THE PURIFICATION OF SEWAGE WATERS

TECHNICAL FIELD

The invention relates to a method for purifying sewage waters which contain ammonia or ammonia compounds.

BACKGROUND ART

The conventional method of treating sewage waters is based on the removal of materials contained in the sewage water by oxidation. For the nitrogeneous load materials, for example, this involves conversion to nitrate. To this end, the prior art large scale methods, for example the activated sludge process, the biological filter process, bio-oxidation ponds and the like are used. In these plants nitrification is effected using ubiquitous nitric bacteria in accordance with the reactions $$NH_4^+ + 1.5O_2 = NO_2^- + 2H^+ + H_2O + 0.66 \text{ kcal}$$
(nitrosomonas)

and $$2NO_2^- + O_2 = 2NO_3^- + 17.5 \text{ kcal (nitrobacter)}$$

As a particularly inexpensive variant, the aerated clearing pond with removal of the materials contained in the sewage water is preferred for some time. Unfortunately the nitrification capacity of such ponds is sometimes very poor.

The more recent developments of sewage purification technology to a large extent involve removal of compounds difficult to be degraded and the removal of the nutrients nitrogen and phosphate in addition to the conventional elimination of the organic substances easily to be degraded. This concept of the process is in conformity with the farther-reaching demands to keep lakes and rivers pure and with the more severe legal regulations resulting therefrom for the passage of purified sewage water into lakes or rivers.

Such a process technology is generally called advanced sewage treatment. Numerous technological developments have been initiated in this respect, and a large number of processes have been suggested. Thus precipitation reactions are used for the elimination of phosphate. In addition, a flocculus rich in phosphate is caused to precipitate in precipitation equipment by adding iron, aluminum and calcium compounds and is separated from the flow of sewage water; see, for example, "Lehr- und Handbuch der Abwassertechnik" Vol. IV: Biologisch-chemische und weitergehende Abwasserreinigung, publisher Ernst & Sohn, Berlin 1985.

At the same time, efforts are made to combine nitrification and subsequent denitrification for the elimination of nitrogen by appropriate technical arrangement. To this end, aerobic and anoxic phases separated in space have to be provided in the purification system and have to be brought into appropriate contact. In many cases, such arrangements prove particularly effective in the removal of compounds difficult to be degraded. For the denitrification as a subsequent process to the nitrification, compartmental plants have been built, which have anoxic areas due to a control of the oxygen gradient, or, after thorough oxidation of the sewage water, the developed nitrate is reduced under anoxic conditions, an electron donator (methanol, molasses) having been added anew; see, for example, "Lehr- und Handbuch der Abwassertechnik," l.c.

As in recent times the removal of ammonia and of its derivates from sewage water has been attached great importance to, at present particular efforts to solve the nitrogen problem in satisfactory manner can be observed. These efforts partially extend already to improved conversion of the ammonia to the substantially less toxic nitrate. However this process does not run in satisfactory manner in large scale sewage treatment plants, thus, for example, in aerated pond plants. Attempts are made here to support nitrification by the construction of additional technical equipment (fixed bed reactors); see, for example, "Lehr- und Handbuch der Abwassertechnik," l.c.

On the other hand, an advanced concept of the process is to remove the nitrate in anoxic phases. With activated sludge plants, denitrification can be carried out in separate tanks. Alternatively simultaneous nitrification and denitrification can be carried out in one tank. However this requires a correspondingly complex control of this advanced sewage water purification. See in this respect for example "Lehr- und Handbuch der Abwassertechnik", l.c.

It has been well known for a long time that appropriately prepared ground bodies in particular planted ground bodies, can be adapted to achieve the advanced sewage water treatment mentioned in the beginning, if certain conditions are met. The land treatment processes quite effective in this respect have been supplemented, in recent times, by additional processes, which use ground bodies or fixed mineral beds and provide considerably higher capacities, see R. Kickuth: "Abwasserreinigung in Mosaikmatritzen aus aeroben und anaeroben Teilbezirken" in F. Moser (editor), "Grundlagen der Abwasserreinigung", Schriftenreihe Wasser-Abwasser 19, München/Wein 1981, page 639 ff.; R. Kickuth: "Verfahren zum Aufbau definierter Phosphatdepots aus Abfallphophaten, European Pat. No. 0028360 of 4/20/83. It could be shown, for example, that planted fixed mineral beds can achieve, besides a noticeable reduction of organic loads, also a considerable elimination of the nutrients phosphate, nitrogen and sulfur. Partially also noticeable elimination capacities with heavy metals and refractory carbon compounds are achieved. Problems may be presented bu such sewage treatment plants due to their (a) rather large area of ground required,
(b) their heavy dependency on atmospheric conditions, for example impeding of the nitrification at low outside temperature,
(c) their relatively low hydraulic capacity.

Thus also this process, which is very advantageous with regard to construction and operating costs and very efficient with regard to capacities, is not without problems, see Kraft: "Zur Problematik der Konstruktion von Sumpfpflanzenkläranlagen"; Korrespondenz Abwasser, Vol 1 (10), pages 840–846.

DISCLOSURE OF INVENTION

It is the object of the invention to provide a method of purifying sewage water, by which, if possible, complete removal of the nitrogeneous nutrients is achieved without adversely affecting the removal of the other nutrients, in particular of phosphate and refractory carbon compounds and heavy metals.

It has been found surprisingly that such a purification to the largest extent can be achieved in two steps, when the nitrogen compounds, i.e. ammonia and ammonia salts, are converted, to a substantial extent, to nitrate, and the sewage water subsequently is subjected to a final nitrification and to denitrification.

Accordingly the object stated hereinbefore is achieved in in that, in a first purification stage, the sewage water is caused to react with atmospheric oxygen oxidizing the major portion of the ammonia to nitrate, and in a subsequent second purification stage, which contains areas rich in atmospheric oxygen and areas poor in atmospheric oxygen, the nitrate formed in the first purification stage is converted to nitrogen.

The reaction with atmospheric oxygen in the first purification stage is effected in a heavy load area, which is provided with conventional equipment, for example activated sludge plants, biological filters, bio-oxidation ponds and the like, for thorough conversion of the materials contained in the sewage water by oxidation, in particular for nitrification. The second downstream purification stage serves for the removal of residual ammonia loads, mainly, however, for the denitrification, for the retention of phosphate and for the elimination of heavy metals and refractory compounds.

Preferably the sewage water is aerated in the first purification stage under conditions favorable for the growth of ubiquitous nitric bacteria. In particular the standardization and maintaining of a favorable pH-range is important therefor, as the ubiquitous nitric bacteria require pH-values above 4.5 (Larcher, "Ökologie der Pflanzen", Ulmer-Verlag 1973) and acid is produced during nitrification. Furthermore the presence of a sufficient quantity of, in particular fine particle, suspended matter has been found stimulating for the growth of the ubiquitous nitric bacteria.

In a preferred embodiment of the method of the invention, a metered quantity of a suspension of calcium hydroxide is added to the sewage water, preferably in the sewage inlet area of the first purification stage. Thereby not only a favorable pH-range of 7 to 8 is adjusted but, at the same time, also the desired suspended matter, for example in the form of calcium carbonate and sometimes also calcium phosphate is obtained.

Advantageously the first purification stage is formed of a specially prepared, aerated pond or a chain of ponds, which is passed through by the sewage water with a predetermined mean dwell or retention time.

Preferably the second purification stage comprises a fixed bed or gravel bed planted with helophytes or limnophytes as disclosed in European Pat. No. 0028360 mentioned above. This fixed bed or gravel bed may additionally be provided with aeration devices and control devices for the flow therethrough.

Advantageously the sewage water is aerated in the second purification stage in an inlet area upstream of the planted, fixed mineral bed, whereby final nitrification of the residual ammonia loads is achieved.

Thus the idea of the invention is to combine a nitrification stage and a final nitrification and denitrification stage, and to optimize the aerated sewage treatment pond, regarded as particular inexpensive, as nitrification stage by particular technical changes and equipment such that it will show considerably better performance in nitrification.

BRIEF DESCRIPTION OF DRAWINGS

An embodiment of a plant for carrying out the method of the invention is illustrated in the drawings and will be described in greater detail hereinbelow.

BEST MODE OF CARRYING OUT THE INVENTION

Figure 1:
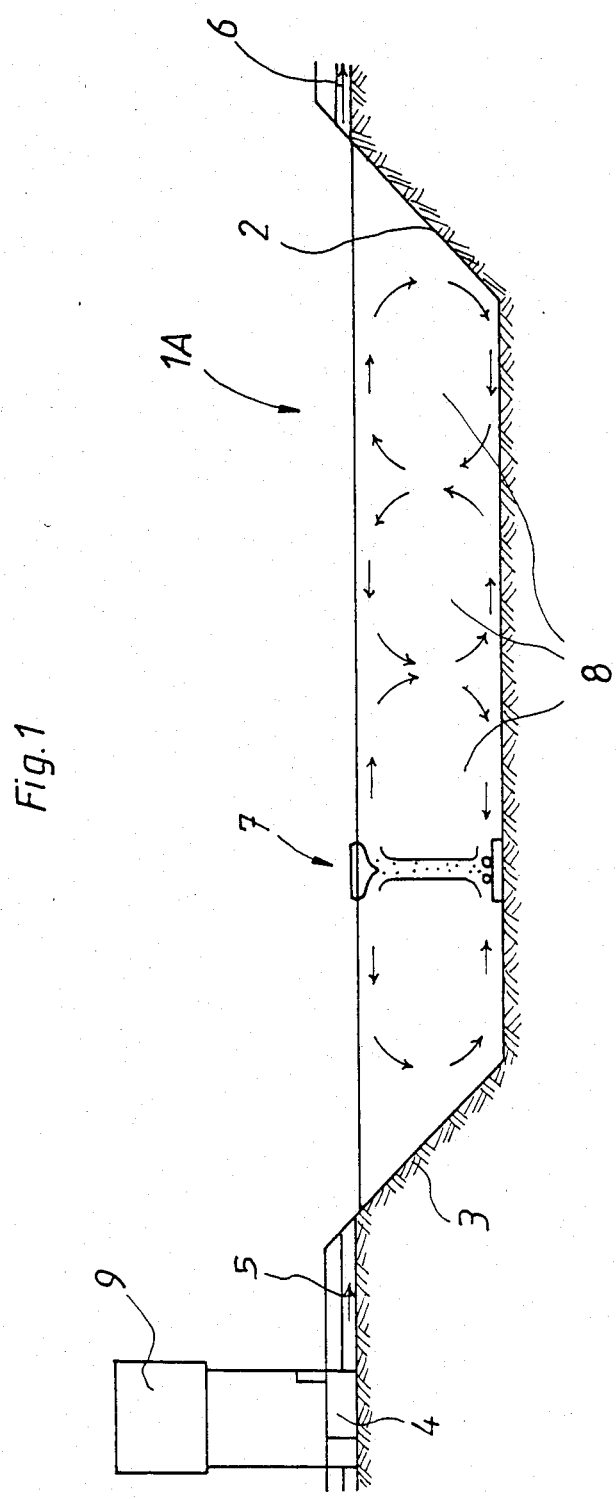
FIG. 1 is a schematic sectional view of the first purification stage.

In the illustrated embodiment described hereinbelow, the first purification stage 1 is formed by a subdivided sewage treatment pond, of which only the sewage treatment pond 1A is shown in FIG. 1. The first purification stage may, however, be formed by any other appropriate large scale sewage treatment system which causes thorough conversion of the suspended matter in the sewage water by oxidiation, in particular the nitrification of ammonia loads, for example an activated sludge plant, a biological filter plant or a bio-oxidation pond.

The sewage treatment pond 1A is dimensioned in accordance with the rules for artificially aerated sewage treatment ponds and consists of an earth basin 2 having a gravel layer 3 in the area of the water surface as a protection against dashing of waves. A rake device 4 is arranged upstream of the earth basin 2, the sewage water being supplied therefrom to the earth pond through inlet pipes 5. Outlet pipes 6 are arranged on the outlet side.

An aeration device 7 of conventional type, see, for example, "Lehr- und Handbuch der Abwassertechnik" l.c. page 50, is provided in the first third of the sewage treatment pond and causes, at the same time, the water body to circulate. An additional circulation device has to provide for appropriate movement of the water body for the case that the aeration is to be interrupted. The position of the aeration device 7 in the first third of the sewage treatment pond 1A causes a flow pattern generally designated by numeral 8 to be formed. The oxygen gradient in the eddies of the flow pattern 8 drops towards the outlet pipes, whereby denitrification processes, if any, in the sewage treatment pond 1A are stimulated.

A conventional metering device 9 is provided in the area of the rake device 4 and serves to add an aqueous suspension of calcium hydroxide in a metered quantity which is sufficient to adjust in the sewage water a pH-range favorable for the ubiquitous nitric bacteria, in particular pH-value in the range of 7 to 8. The suspension is added in metered quantities with regard to volume and/or concentration of the calcium hydroxide in accordance with the conditions determined by the sewage water such that the desired pH-range is adjusted The metering device 9 can also be arranged at any other location in the inlet area of the sewage treatment pond. By the adding of the calcium hydroxide in metered quantities, the lowering of the pH-value is counteracted, which is detrimental to biological processes, in particular to nitrification. Precpitation of calcium carbonate is caused in the upstream third by interaction with the hydrogen carbonate ions formed in the course of the BOD-decomposition, this calcium carbonate being held in suspension by water circulation according to the flow pattern 8 and being deposited, at the earliest, in the very last section of the flow path. The suspended matter thus formed serves to stimulate the growth of the ubiquitous nitric bacteria. At the same time, ammonia is expelled to a considerable extent (stripping), which can be estimated to be about 20 percent.

Thus in the first purification stage 1 favorable growth conditions for the ubiquitous nitric bacteria are provided by the metered adding of the aqueous solution of calcium hydroxide both with respect to the pH-value and with respect to the desired suspended matter, whereby favorable conditions for the oxidation of ammonia or ammonia compounds, respectively, in accordance with the reaction equations recited in the beginning $$NH_4^+ + 1.5O_2 = NO_2^- + 2H^+ + H_2O + 0.66 \text{ kcal}$$
(nitrosomonas)

and $$2NO_2^- + O_2 = 2NO_3^- + 17.5 \text{ kcal (nitrobacter)}$$

are achieved. The stripping proportion can be estimated from the dissociation constant of ammonium hydroxide, the pH-value in the reaction zone and the partial pressure of ammonia above aqueous solutions, see "Koppers Handbuch der Brennstofftechnik", Koppers AG, Essen 1937. Instead of calcium hydroxide also other basic substances can be used; if such basic substances do not form suspended matter under the reaction conditions, the adding of inert or not acid-forming suspended matter or of suspensions of suspended matter is recommended.

Figure 2:
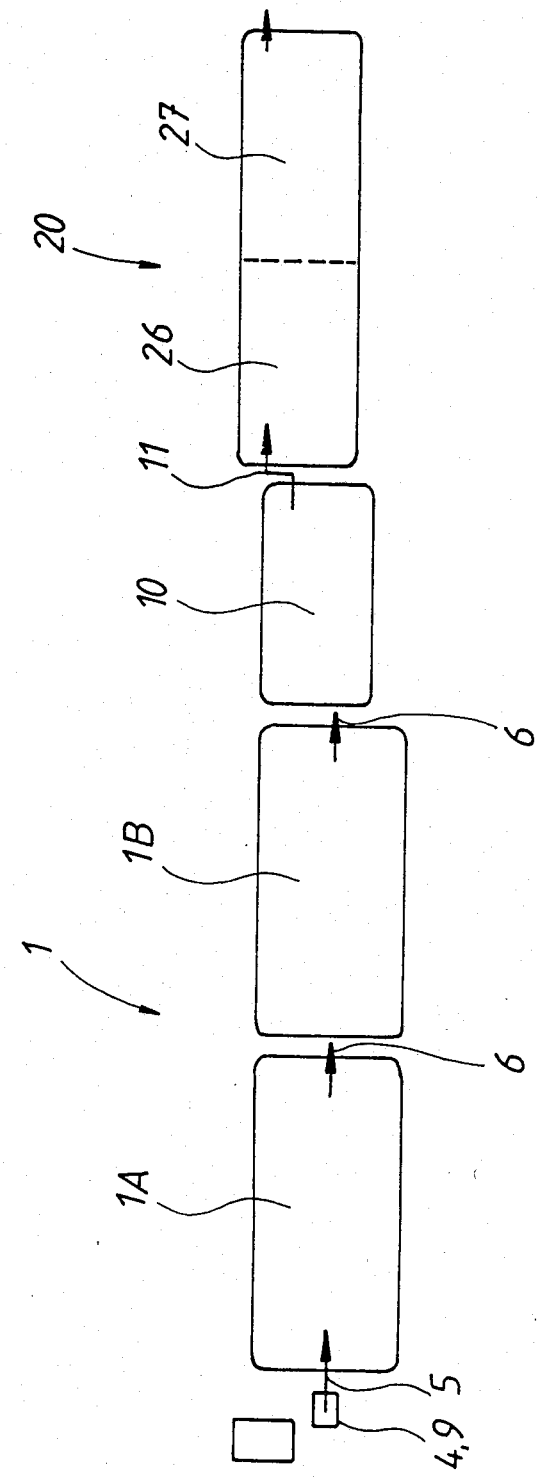
FIG. 2 is a schematic plan view of the total plant.
Figure 3:
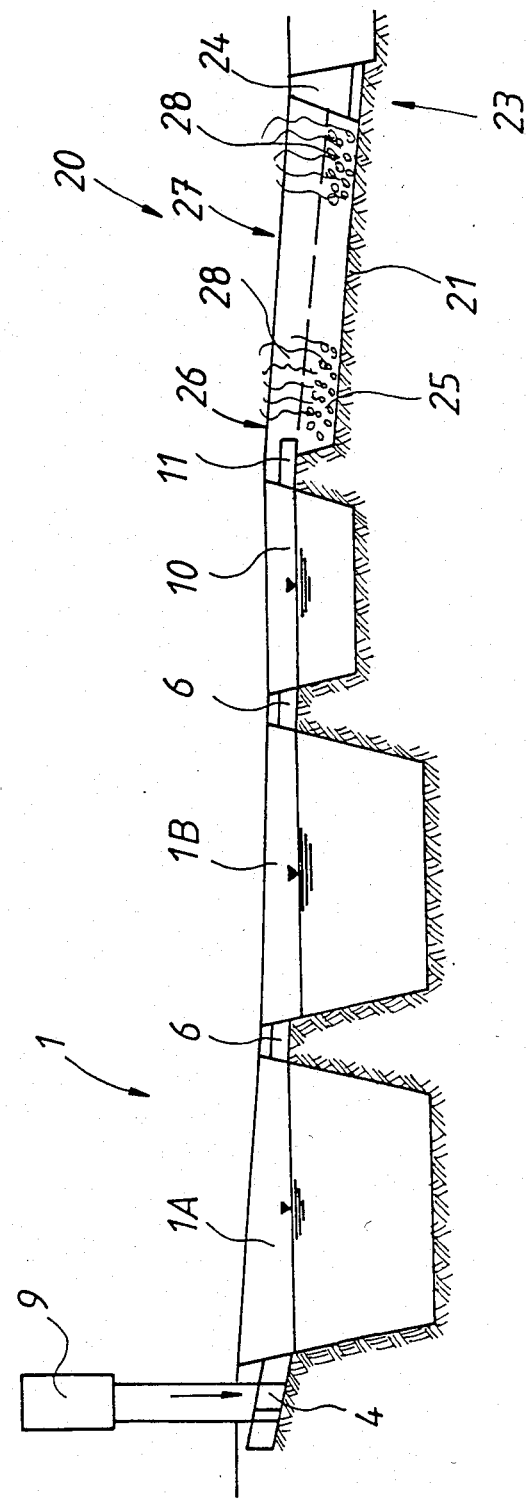
FIG. 3 is a schematic longitudinal sectional view of the total plant.

Preferably the first purification stage 1 comprises a sewage treatment pond, as shown in FIG. 2. This sewage treatment pond is subdivided into two sewage treatment ponds 1A and 1B of substantially identical construction and equipment. Both sewage treatment ponds are earth basins and are provided with an aerating device not illustrated in detail of the type of aerating device 7. These aerating devices generate, in the sewage treatment ponds, the flow pattern 8 described hereinbefore. A metering device 9 for the metered adding of aqueous suspension of calcium hydroxide is provided, at first, for the sewage treatment pond 1A. If required, such a metering device can, however, also be arranged in the inlet area of the sewage treatment pond 1B.

The total mean dwell time in the sewage treatment ponds 1A and 1B of the sewage water with the aqueous solution of calcium hydroxide added is at least 5 days. In the embodiment described, this total mean dwell time is 7.1 days. It may, however, also be shorter or longer depending on the respective conditions or dirt loads.

At the outlet of the second sewage treatment pond 1B, sewage water is obtained the $BOD_5$-value of which is reduced considerably, the ammonia nitrogen of which has substantially been converted to nitrate and the phosphate contents of which has been reduced, see the data given hereinbelow.

As has been illustrated in FIG. 2, the pre-treated sewage water obtained from sewage treatment pond 1B, at first, overflows into a secondary sewage treatment pond 10, which is followed by the second purification stage 20. This secondary sewage treatment pond is also an earth pond. Its inlet pipes are outlet pipes 6 of the sewage treatment pond 1B and its depth is about 1 meter. In particular the activated sludge and other suspended particles are deposited in the secondary sewage treatment pond. If required, an aerating device may be provided also in combination with the sedonary sewage treatment pond. As a rule, however, such an aeration device is not necessary. An outlet, for example of outlet pipes leads from the secondary sewage treatment pond to the second purification stage 20. The mean dwell time of the sewage water in the secondary sewage treatment pond 10 is about 1 to 2 days.

The sewage water which emerges from the first purification stage 1 or the secondary sewage treatment pond, respectively, and which is to a large extent nitrified, is now transferred to the second purification stage 20, in which the residual ammonia loads (if still present) are eliminated and nitrate is reduced to elementary nitrogen.

The second purification stage 20 consists of an earth pond 21 having an inlet 22, which is connected to the outlet 11 of the secondary sewage treatment pond 10, and an outlet 23. The earth pond 21 is inclined towards the outlet 23. Means such as a conventional variable height outlet 24 are provided to adjust a predetermined hydraulic gradient and thus a predetermined mean dwell time in the second purification stage 20. If a large longitudinal hydraulic gradient exists, the second purification stage 20 may be subdivided by a tight transverse wall by which the sewage water is stemmed. Then transfer is effected through drain pipes.

The earth pond 21 contains a gravel bed or fixed bed 25 and is subdivided into an upstream area 26 and a main area 27, which are functionally separated but form a constructional unit. In the upstream area 26, residual ammonia loads, if still present, are removed by secondary aeration. This can be achieved in natural way by diffusion through the water surface, or artifically by conventional aeration candles connected to a source of pressurized air. If the second purification stage predominantly has to effect denitrification—besides P-retention and removal of refractory C-compounds—the secondary aeration is limited to the very first sections of this second purification stage 20 and may even be omitted completely. If, however, still considerable quantities of ammonia nitrogen are transferred from the first purification stage 1 to the second purification stage 20, also the main area 27 of the second purification stage 20 may be provided with aerating devices along all of its length. These aerating devices, as a rule, are aerating candles of conventional design extending horizontally in the gravel body.

In the main area 27, the gravel bed or fixed bed 25 is planted with limnophytes or emersed helophytes 28 of the species recited in European Pat. No. 0028360 mentioned hereinbefore, in particular with large reed species, among which the common reed (phragmites australis) has to be given particular prominence to. Apart from this, numerous adaptations to the given local and sewage technology situation are possible.

The function of the helophytes 28 is as follows:

1. Through carbon compounds produced by means of photosynthesis, they uniformly provide reduction equivalents for the denitrification in the form of their roots and rhizomes.

2. Due to the rhizosphere effect, they build up dense and specific populations of micro-organisms in the gravel bed 25 penetrated by roots.

3. By the well-known oxygen transfer through the shoot aerenchyme into the root and rhizome area, they build up aerobic miroc-compartments in the immediate vicinity of the underground organs, in which residual loads to be removed aerobicially can be degraded.

Depending on the season, the fixed bed or gravel bed 25 is planted with rhizomes or container plants. The run up phase is about 3 years.

Through the cutting-off of the water body from contact with atmospheric air effected in the planted gravel bed or fixed bed 25 (grain size in the range from 8 to 32 millimeters), and by the oxygen consumption by the charge of reducing organic material provided by roots and rhizomes of the plants used, the aerobic condition is changed—depending on the aeration selected—to an anoxic condition, in which the setting free of elementary oxygen begins.

Also this process is stimulated by high pH-values. Therefore it is advantageous for the method of the invention to construct the fixed bed or gravel bed of lime or dolomite gravel. Already in this form, the sewage treatment pond stimulates the precipitation of the phosphate as octo calcium phosphate. The precipitation of phosphate can be enhanced additionally by using ferriferous material or by mixing ferruginous material as a second component with the gravel bed or fixed bed 25.

The mean dwell time in the second purification stage 20 is adjusted by means of the outlet 23 and is determined by the residual load, which, in turn, is dependent on the mean dwell time of the sewage water in the first purification stage 1.

As a whole the second purification stage 20 presents an extrordinary complex and variable structure of effects which adapts itself and can be adapted to the different sewage water conditions. The grain sizes (8 to 32 millimeters) of such planted fixed mineral beds are well known. By their selection these purification stages can be dimensioned reliably.

A condition for controlled and uniform operation of the planted fixed bed or gravel bed 25 is the permanent and complete hydromorphy, i.e. the complete water saturation of the pore structure. This is achieved by controlling the hydraulic gradient by means of the outlet, for example by means of the variable height outlet 24 mentioned hereinbefore.

Altogether outlet values can be achieved with the method of the invention as characterized by the following data:

| | |
|---|---|
| $BOD_5$ | <10 mg/l |
| COD | <50 mg/l |
| $NH_4$—N | <5 mg/l |
| $NO_3$—N | <10 mg/l |
| total P | <1 mg/l |
| Elimination of E. coli, coliform germs and salmonella (bacilli) | >99% |

Subsequently the data of the embodiment are given in detail.

DIMENSIONS OF THE SEWAGE TREATMENT PONDS

1. Basis for Calculation

1.1 Dry Weather Inflow

| Waste Water | | |
|---|---|---|
| Population equivalent | EGW = | 1500 — |
| specific sewage production | qs = | 150 l/EGW/d |
| distribution time | dt = | 8 h/d |
| dry weather inflow | Qh = | 7.8 l/s |
| | = | 225 cbm/d |
| Infiltration Water | Qf = | 225 cbm/d |

| -continued | | |
|---|---|---|
| about 100 percent of the domestic sewage | = | 2.6 l/s |
| Dry Weather inflow | Qt = | 10.4 l/s |
| | = | 450 cbm/d |

1.2 Dirt Loads

| | | |
|---|---|---|
| $BOD_5$ | | |
| specific quantity | s = | 60 g/EGW |
| 60 × 1500/1000 | S = | 90 kg/d |
| 90/10.4/3.6/8 × 1000 | S = | 300 mg/l |
| distributed over 24 hours: 90/450 × 1000 | S = | 200 mg/l |
| $NH_4$—N | | |
| specific quantity | s = | 12 g/EGW |
| 12 × 1500/1000 | S = | 18 kg/d |
| 18/10.4/3.6/8 × 1000 | S = | 60.1 mg/l |
| distributed over 24 hours: 18/450 × 1000 | S = | 40 mg/l |

2. Components of Sewage Treatment Plant

2.1 Upstream Construction (Rake)

In order to remove grit, a counter-flow rake is arranged in front of the sewage water ponds 1A and 1B. The rake construction 4 operates automatically depending on the degree of coverage of the rake. The rake material is conveyed to a container and subsequently removed to a garbage dump.

Slot width: e = 20 mm
Rod diameter: s = 10 mm
Rake width: br = 0.4 m
Rake depth: t = 0.6 m
Rake height: h = 0.5 m

| Production of Grit | | |
|---|---|---|
| specific production | rg = | 8 l/EGW/a |
| annual production 8 × 1500/100 | RG = | 12 cbm/a |
| mean daily production 12/365 × 1000 | RG = | 33 l/d |
| First Purification Stage 1 as aerated sewage treatment pond plant | | |

2.2 Aerated Sewage Treatment Ponds

| | | |
|---|---|---|
| selected specific volume load | BR = | 30 g $BOD_5$/d |
| pond volume required 90 × 1000/30 | Verf = | 3000 cbm |

Two ponds of identical surface areas are provided.

| | | |
|---|---|---|
| water depth of the ponds | h = | 2.0 m |
| length of a pond | L = | 46.0 m |
| width of a pond | B = | 23.0 m |
| slope | n = | 2 — |
| volume of one pond | V = | 1607 cbm |
| freeboard | hf = | 0.40 m |
| total depth | h = | 2.4 m |
| length of a pond along upper edge | L = | 47.6 m |
| width of a pond along upper edge | B = | 24.6 m |
| total volume | V = | 2052 cbm |
| dwell or retention time with dry weather inflow 1607 × 2/450 | ta = | 7.1 d |

2.3 Secondary Sewage Treatment Pond 10

| | | |
|---|---|---|
| water depth | h = | 1.0 m |
| surface area | A = | 500 sqm |
| volume | V = | 500 cbm |
| dwell time about | ta = | 1.0 d |
| Second Purification Stage 20 as planted gravel bed 25 | | |

2.4 Gravel Bed 25

| | | |
|---|---|---|
| depth | h = | 0.6 m |
| surface area | A = | 700 sqm |
| volume | V = | 420 cbm |
| grain size of gravel | dmin = | 8 mm |
| | dmax = | 32 mm |
| mean grain diameter | d = | 25 mm |

The mean flow rate in gravel bottomings is determined in accordance with a work made at the Institut für Hydraulik and Hydrologie of the Technische Hochschule Darmstadt $$v = -a/2/b + \text{sqr}((a/2/b)xx2 + J/b)$$

with $$a = c1 \times n y/g/d/d$$

$$b = c2/g/d$$

In analogy with a one component ball layer the components c1 and c2 are selected as follows:

$$c1 = 1250;\ c2 = 20$$

With a longitudinal hydraulic gradient of 2 per thousand the following mean flow rate results:

$$a = 1250 \times 1.3 \times 10 - 6/.025/.025 = 0.265$$
$$b = 20/g/.025 = 81.55$$
$$v = -.265/2/81.55 +$$

$$\text{sqr}((0.265/2/81.55)xx2 + .002/81.55) = 0.0036\ m/s$$

| | | |
|---|---|---|
| inlet width | | 7.0 m |
| inlet hight | h = | 0.6 m |
| maximum through-flow .0036 × 7 × .6 × 1000 | Q = | 15.1 l/s |

The through-flow is controlled and amounts to between and 0 and 15.1 l/s.

3. Purification Capacity

First Purification Stage 1

3.1 Purification Capacity of the Sewage Water Pond 1A

| | | |
|---|---|---|
| BOD$_5$: | | |
| area load 90/23/46 × 1000 | FB = | 85 g/sqm |
| purification capacity | eta = | 72.4% |
| dirt load in outlet | | |
| (1 − .724) × 90 | Sab = | 24.8 kg BOD$_5$/d |
| (1 − .724) × 200 | = | 55.2 mg BOD$_5$/l |
| dwell or retention time in first pond 1607/450 | ta = | 3.57 d |
| degradation of BOD in 3.57 days (90 − 24.8) × 3.57 | BOD aB = | 233 kg BOD$_5$ |
| Production of CO$_2$ 233 × 1.375 | = | 320 kg CO$_2$ |
| Production of CaCO$_3$ 1 g CO$_2$ - 1.91 g CaCO$_3$ 320 × 1.91 | = | 611 kg CaCO$_3$ |
| NH$_4$—N: | | |
| Purification capacity: by deposition in primary sludge | eta = | 15% |
| purification capacity by stripping | eta = | 20% |
| dirt load 18 × (1 − .35) | S = | 11.7 kg NH$_4$—N/d |
| purification capacity due to bacteria contained in sewage water | | |
| surface of sewage water pond 1A 23 × 46 | = | 1058 sqm |
| free surface of CaCO$_3$ | 10 to 50 sqm/g | |
| total surface of CaCO$_3$ | 10 × 1000 × 611 = | 6.1 × 10 6 qm |

Assumption:
1 per thousand of the area is available as growth surfac to the nitric bacteria

| | | |
|---|---|---|
| surface area of CaCO$_3$ covered 6.1 × 100000/1000 | = | 6100 sqm |
| total surface area 1058 + 6100 | A = | 7158 sqm |
| surface load: 11.7/7158 × 1000 | FB = | 1.6 g/sqm |
| purification capacity due to surface load | eta = | 50% |
| total purification capacity in first pond 50 + 15 + 20 | eta = | 85% |
| dirt load in outlet | | |
| (1 − .850) × 18 | Sab = | 2.7 kg NH$_4$—N/d |
| (1 − .850) × 40 | = | 6.0 mg NH$_4$—N/l |

3.2 Purification Capacity of Sewage Water Pond 1B

| | | |
|---|---|---|
| BOD$_5$: | | |
| surface load 24.8/23/46 × 1000 | FB = | 23.4 g/sqm |
| purification capacity | eta = | 81.2% |
| dirt load in outlet | | |
| (1 − .812) × 24.8 | Sab = | 4.7 kg BOD$_5$/d |
| (1 − .812) × 55.2 | = | 10.4 mg BOD$_5$/l |

-continued

NH$_4$—N:
It is assumed that nitrification takes place only on the surface of sewage water pond 1B

| | | |
|---|---|---|
| surface load | FB = | 2.6 g/sqm |
| 2.70/23/46 × 1000 | | |
| purification capacity: | eta = | 15% |
| due to surface load | | |
| dirt load in outlet | | |
| (1 − .15) × 2.7 | Sab = | 2.3 kg NH$_4$—N/d |
| (1 − .15) × 6.0 | = | 5.1 mg NH$_4$—N/l |

The purification capacity eta is calculated from the dirt load in the inlet Szu and the dirt load in the outlet Sab in accordance with the formula purification capacity in percent = Szu−Sab/Szu.

As far as the purification capacity due to deposition is concerned, see "Abwasserreport" No. 3, Hessische Landesanstalt für Umwelt of Mar. 1, 1985.

The purification capacity by stripping was estimated from the dissociation constant of ammoniumhydroxide, the pH-value and the partial pressure of ammonia above aqueous solutions (Koppers Handbuch der Brennstofftechnik, l.c.).

The free surface area of calcium carbonate was calculated for freshly precipitated calcium carbonate of a particle size in the range of 2 to 200 mµ.

Nitric bacteria grow on all surfaces at pH$\geq$4.5; see Larcher, Ökologie der Pflanzen, Ulmer-Verlag 1973.

The purification capacity eta=50% due to the nitric bacteria was gathered from: "Bericht über die Versuche mit dem BIO-NET- Tauchkörper zur biologischen Reinigung von kommunalem Abwasser", Institut für Sidelungswasserbau, Wassergüte und Abfallwirtschaft der Universität Stuttgart, Abteilung Abwassertechnik, 9/29/83.

Second Purification Stage 20

3.3 Gravel Bed 25 (Purification Capacity and Dimensioning)
Inflow Loads

| | | |
|---|---|---|
| BOD$_5$: | S = | 4.7 kg BOD$_5$/d |
| NH$_4$—N: | S = | 2.3 kg NH$_4$—N/d |
| NO$_3$—N: | | |
| Conversion of NH$_4$—N to NO$_3$—N | = | 9.4 kg NH$_4$—N/d |
| in the first purificaton stage = | | |
| 18 × (1 − .35) − 2.3 | | |
| NO$_3$—N | S = | 9.4 kg NO$_3$—N/d |

Outflow Loads
(corresponding to lake and river quality class II)

| | | |
|---|---|---|
| BOD$_5$ | Sab = | 6.0 mg BOD$_5$/l |
| 6.0 × 450/1000 | = | 2.7 kg BOD$_5$/d |
| degradation rate 4.7 − 2.7 | = | 2.0 kg BOD$_5$/d |
| degradation capacity 2.0/4.7 × 100 | = | 43% |
| NH$_4$—N | Sab = | 1.7 mg NH$_4$—N/l |
| 1.7 × 450/1000 | = | 0.8 kg NH$_4$—N/d |
| degradation rate 2.3 − 0.8 | = | 1.5 kg NH$_4$—N/d |
| degradation capacity 1.5/2.3 × 100 | = | 65% |
| NO$_3$—N | Sab = | 6.0 mg NO$_3$—N/l |
| 6.0 × 450/1000 | = | 2.7 kg NO$_3$—N/d |
| degradation rate 9.4 + 0.8 − 2.7 | = | 7.5 kg NO$_3$—N/d |
| degradation capacity 7.5/(9.4 + 0.8) × 100 | = | 74% |

3.3.1 Upstream Area specific oxygen consumption

| | |
|---|---|
| for BOD$_5$ = | 1.5 kg O$_2$/kg BOD$_5$ |
| for NH$_4$—N = | 4.57 kg O$_2$/kg NH$_4$—N | oxygen demand

| | |
|---|---|
| 2.0 × 1.5 + 1.5 × 4.57 = | 9.86 kg O$_2$/d |
| oxygen saturation = | 9.00 mg/l |
| oxygen present at saturation 9 × 450/1000 = | 4.05 kg O$_2$ |

Degradation function of the oxygen depending on the flow distance according to print A II, Institut für Wasserversorgung, Abwasser- beseitigung und Stadtbauwesen, Technische Hochschule Darmstadt:

$$DO_2 = L \times (1-\exp(-k1 \times t)) = L \times (1-\exp(-k1 \times V/Q))$$

with
$V = B \times L \times H \times n$
$DO_2$ = oxygen consumption
$k1$ = degradation rate coefficient
$L$ = flow distance
$t$ = dwell or retention time
$V$ = volume
$Q$ = flow rate
$B$ = width of flow cross section
$H$ = height of flow cross section
$n$ = pore volume of gravel bed
with
$B = 20$ m
$H = 0.6$ m
$n = 0.5$—
$Q = 450$ cbm/d
$k1 = 0.77$/d
$DO_2 = 9$ mg/l
results for the flow distance of $$0.9 = L \times (1-\exp(-0.103 \times L))$$

| | | |
|---|---|---|
| Solution by iteration: | L = | 32 m |
| surface of upstream area, 20 × 32 | A = | 640 sqm |
| additional oxygen supply by | O$_2$ = | 10 g/sqm/d |
| the plants according to | | |
| "Cultivating Reeds for Root Zone | | |
| Treatment of Sewage, WRC, Grange- | | |
| over-Sands, Cumbria 1985" | | |
| 10 × 640/1000 | = | 6.4 kg O$_2$/d |
| oxygen deficit | d O$_2$ = | 3.46 kg O$_2$/d |
| 9.86 − 6.4 | | |

An additional aeration device is provided which covers this oxygen demand. The oxygen contents of the water has to reach the following value:

| | | |
|---|---|---|
| 3.46/450 × 1000 | O$_2$ = | 7.7 mg O$_2$/l |

3.3.2 Main or Denitrification Area 27

| | | |
|---|---|---|
| NO$_3$—N | | |
| degradation rate | = | 2.7 kg NO$_3$—N/d |
| specific degradation capacity | dS = | 10 to NO$_3$—N/ha |

-continued

| | | |
|---|---|---|
| area requirement | = | 2.74 g NO$_3$—N/sqm/d |
| 2.7/2.74 × 1000 | A = | 985 sqm |
| selected: | | |
| bed width | B = | 20 m |
| bed length | L = | 50 m |

2.5 Oxygen Demand

2.5.1 Oxygen Demand in the Sewage Water Ponds 1A, 1B

| | | |
|---|---|---|
| BOD$_5$ degradation in the ponds | S = | 85.3 kg BOD$_5$/d |
| 90.0 − 4.7 | | |
| oxygen demand | O$_2$ = | 1.5 kg O$_2$/kg BOD$_5$ |
| 85.3 × 1.5 | O$_2$ = | 128 kg O$_2$/d |
| fine bubble aeration: | | |
| oxygen supply with average conditions | = | 8 g O$_2$/cbm/m |
| injection depth | = | 2.0 m |
| air supply | | |
| 128 × 1000/2.0/8 | = | 8000 cbm/d |
| 8000/24 | = | 333 cbm/h |

2.5.2 Oxygen Demand in the Gravel Bed 25

| | | |
|---|---|---|
| NH$_4$—N degradation in gravel bed 15.3 − 1.5 | S = | 13.8 kg NH$_4$—N/d |
| oxygen demand | O$_2$ = | 4.57 kg O$_2$/kg NH$_4$—N |
| 13.8 × 4.57 | O$_2$ = | 63.1 kg O$_2$/d |
| 63.1/1.45 | O$_2$ = | 43.5 cbm O$_2$/d |
| oxygen supply to a planted gravel bed | O$_2$ = | 20 g/sqm/d |
| maximum value | O$_2$ = | 59 g/sqm/d |
| available area | A = | 700 sqm |
| oxygen supply | O$_2$ = | 14 kg O$_2$/d |
| 20 g/d | = | 9.7 cbm O$_2$/d |
| 59 g/d | = | 41.3 kg O$_2$/d |
| | = | 28.5 cbm O$_2$d |
| oxygen in inlet, which is available for nitrification: | = | 5 mg/l |
| inlet quantity | = | 450 cbm/d |
| oxygen reserve 5/1000 × 450 × 1.45 | = | 3.3 cbm O$_2$/d |

In order to cover the oxygen demand for nitrification, aeration candles are built into the gravel trench.

The aeration is dimensioned for the minimal oxygen supply due to the plants. The demand is controlled accordingly.

| | |
|---|---|
| oxygen deficit | |
| 43.5 − 9.7 − 3.3 = | 30.5 cbm O$_2$/d |
| 30.5 × 1.45 = | 44.2 kg O$_2$/d |
| fine bubble aeration | |
| oxygen supply with average conditions = | 8 g O$_2$/cbm/m |
| injection depth = | 0.6 m |
| air supply | |
| 44.2 × 1000/0.6/8 = | 9208 cbm/d |
| 9208/24 = | 384 cbm/h |

2.5.3 Dimensioning of the Aeration Station

Two aeration aggregates are provided. The first one serves for the aeration of the sewage water ponds 1A, 1B. The second one is dimensioned for the aeration of the gravel bed 25 and can be employed, if required, as a stand-by aggregate for the aeration of the sewage water ponds 1A, 1B.

| | | |
|---|---|---|
| delivery rate (maximum) | Q = | 384 cbm/h |

-continued

| | | |
|---|---|---|
| selected: | Q = | 400 cbm/h |
| length of pipe | L = | 170 m |
| diameter | DN = | 100 mm |
| mean flow rate | vm = | 14.15 m/s |
| frictional losses | | |
| roughness | ks = | 1.0 mm |
| resistance coefficient | lamda = | 0.02 — |
| frictional loss | DelP = | 4102 N/sqm |
| 0.02 × 170/.100 × 14.15 × 14.15/2 × 1.205 | | |
| individual losses | | |
| 10 elbows | ZetKr = | 0.14 — |
| 5 T-pieces | ZetT = | 1.28 — |
| 5 sliding valve | ZetS = | 0.40 — |
| inlet | ZetE = | 0.50 — |
| outlet | ZetA = | 1.00 — |
| 10 × .14 + 5 × 1.28 + 0.50 + 1.0 | ZetG = | 9.3 — |
| pressure loss | | |
| 9.3 × 12.38 × 12.38/2 × 1.205 | DelE = | 860 N/sqm |
| total loss: | | |
| 4102 + 860 | DelG = | 4962 N/sqm |
| 4962 × 1.02 × 0.000001 | = | 0.05 at |
| | = | 0.50 mWS |
| margin of safety | DelS = | 0.20 mWS |
| pond depth | t = | 2.40 m |
| manometric delivery height | Hman = | 3.10 mWS |
| blower power required: | | |
| air flow rate | Q = | 400 cbm/h |
| | = | 6.6 cbm/min |
| pressure | DelP = | 3.1 mWS |
| | = | 310 mbar |

We claim:

1. A method of purifying sewage waters which contain ammonia, compounds containing ammonia or both, comprising:

in a first purification stage, passing said sewage waters through at least one sewage water pond, aerating said sewage waters as said sewage waters pass through said sewage water pond and adjusting the pH of said sewage waters to a value in the slightly alkaline regimen to stimulate the growth of ubiquitous nitric bacteria, whereby at least a major portion of said ammonia, compounds containing ammonia or both is oxidized to nitrate and pretreated sewage waters containing nitrate and residual ammonia, residual ammonia containing compounds or both are formed;

passing said pretreated sewage waters containing nitrate and residual ammonia, residual ammonia containing compounds or both from said sewage water pond of said first purification stage into contact with a reaction medium of a subsequent, second purification stage, said reaction medium having areas rich in atmospheric oxygen and areas poor in atmospheric oxygen; and in said subsequent, second purification stage, flowing said pretreated sewage waters containing nitrate and residual ammonia, residual ammonia containing compounds or both through said reaction medium having areas rich in atmospheric oxygen and areas poor in atmospheric oxygen and thereby converting at least a predominant portion of said residual ammonia, residual ammonia containing compounds or both and at least a predominant portion of said nitrate to nitrogen.

2. A method as claimed in claim 1, which is further characterized to include the step of adding suspended matter to said sewage waters in said sewage water pond of said first purification stage to stimulate the growth of ubiquitous nitric bacteria.

3. A method as claimed in claim 1, wherein said suspended matter added to said sewage waters in said sewage water pond of said first purification stage comprises calcium hydroxide, said calcium hydroxide serving to adjust the pH of said sewage waters to said value in said slightly alkaline regimen.

4. A method as claimed in claim 3, wherein said calcium hydroxide is added to said sewage waters in said sewage water pond of said first purification stage as a suspension in metered quantities, said metered quantities being sufficient to adjust the pH of said sewage waters in said sewage water pond of said first purification stage to a value in the range of from 7 to 8.

5. A method as claimed in claim 1, wherein said sewage waters are aerated in the first third of said sewage water pond of said first purification stage as said pond is viewed in the throughpass direction of said sewage waters therethrough.

6. A method as claimed in claim 5, wherein said step of aerating said sewage waters as said sewage waters pass through said sewage water pond of said first purification stage comprises circulating said sewage waters in said sewage water pond of said first purification stage in accordance with a predetermined flow pattern comprising a sequence of a predetermined number of adjacent circulating flow paths.

7. A method as in claim 1, wherein said sewage waters are passed through said sewage water pond of said first purification stage with a predetermined mean retention time.

8. A method as claimed in claim 1, wherein said reaction medium having areas rich in atmospheric oxygen and areas poor in atmospheric oxygen of said subsequent, second purification stage comprises a stationary mineral bed that is planted with emersed helophytes and in a substantially completely hydromorphous condition.

9. A method as claimed in claim 8, wherein said helophytes are comprised of a large reed species.

10. A method as claimed in claim 8, wherein said pretreated sewage waters are aerated as they flow through said stationary mineral bed.

11. A method as claimed in claim 8, wherein said pretreated sewage waters are aerated in an inlet area arranged upstream of said stationary mineral bed.

12. A method as claimed in claim 8, wherein said pretreated sewage waters are made to flow through said stationary mineral bed with a predetermined mean retention time.

13. A method as claimed in claim 12, wherein said mean retention time of said pretreated sewage waters in said stationary mineral bed is adjusted by adjusting the hydraulic gradient as a function of said predetermined mean retention time of said sewage waters in said sewage water pond of said first purification stage, said hydraulic gradient being adjusted in a manner so as to maintain said stationary mineral bed in said substantially completely hydromorphous condition.

14. A method as claimed in claim 8, wherein said stationary mineral bed is constructed of limestone or dolomite, said limestone or dolomite having a grain size in the range of from 8 to 32 millimeters.

15. A method as claimed in claim 14, which is further characterized to include the step of adding ferruginous material to said stationary mineral bed.

16. A method as claimed in claim 1, which is further characterized to include the step of:
after passing said sewage waters through said sewage water pond of said first purification stage and prior to passing said pretreated sewage waters containing nitrate and residual ammonia, residual ammonia containing compounds or both into contact with said reaction medium having areas rich in atmospheric oxygen and areas poor in atmospheric oxygen of said subsequent, second purification stage, passing said sewage waters through a sedimentation pond.

17. A method as claimed in claim 1, wherein said sewage waters are supplied to said sewage water pond of said first purification stage through grating means arranged upstream thereof.

18. A method or purifying sewage waters which contain ammonia, compounds containing ammonia or both, comprising:
in a first purification stage, passing said sewage waters through at least one sewage water pond, aerating said sewage waters as said sewage waters pass through said sewage water pond and adding suspended matter to said sewage waters in said sewage water pond to adjust the pH of said sewage waters to a value in the slightly alkaline regimen and thereby stimulate the growth of ubiquitous nitric bacteria whereby at least a major portion of said ammonia, compounds containing ammonia or both is oxidized to nitrate and pretreated sewage waters containing nitrate and residual ammonia, residual ammonia containing compounds or both are formed;
passing said pretreated sewage waters containing nitrate and residual ammonia, residual ammonia containing compounds or both from said sewage water pond of said first purification stage into a stationary mineral bed of a subsequent, second purification stage, said stationary mineral bed being planted with emersed helophytes and in a substantially completely hydromorphous condition and thereby having areas rich in atmospheric oxygen and areas poor in atmospheric oxygen; and
in said subsequent, second purification stage, flowing said pretreated sewage waters containing nitrate and residual ammonia, residual ammonia containing compounds or both through said stationary mineral bed and thereby converting at least a predominant portion of said residual ammonia, residual ammonia containing compounds or both and at least a predominant portion of said nitrate to nitrogen.

19. A method as claimed in claim 18 wherein said suspended matter added to said sewage water in said sewage water pond of said first purification stage comprises calcium hydroxide.

20. A method as claimed in claim 18 wherein said calcium hydroxide is added to said sewage waters in said sewage water pond of said first purification stage as a suspension in metered quantities, said metered quantities being sufficient to adjust the pH of said sewage waters in said sewage water pond to a value in the range of from 7 to 8.

21. A method as claimed in claim 20 wherein said sewage waters are aerated in the first third of said sewage water pond of said first purification stage as said pond is viewed in the throughpass direction of said sewage waters therethrough.

22. A method as claimed in claim 21 wherein said step of aerating said sewage waters as said sewage waters pass through said sewage water pond of said first purification stage comprises circulating said sewage waters in said sewage water pond in accordance with a predetermined flow pattern comprising a sequence of a predetermined number of adjacent circulating flow paths.

23. A method as claimed in claim 18 wherein said sewage waters are passed through said sewage water pond of said first purification stage with a predetermined mean retention time.

24. A method as claimed in claim 18 wherein said helophytes are comprised of a large reed species.

25. A method as claimed in claim 18 wherein said pretreated sewage waters are made to flow through said stationary mineral bed with a predetermined mean retention time.

26. A method as claimed in claim 25 wherein said mean retention time of said pretreated sewage waters in said stationary mineral bed is adjusted by adjusting the hydraulic gradient as a function of said predetermined mean retention time of said sewage waters in said sewage water pond of said first purification stage, said hydraulic gradient being adjusted in a manner so as to maintain said stationary mineral bed in said substantially completely hydromorphous condition.

27. A method as claimed in claim 18 wherein said stationary mineral bed is constructed of limestone or dolomite, said limestone or dolomite having a grain size in the range of from 8 to 32 millimeters.

28. A method as claimed in claim 18 which is further characterized to include the step of adding ferruginous material to said stationary mineral bed.

29. A method as claimed in claim 18 wherein said pretreated sewage waters are aerated as they flow through said stationary mineral bed.

30. A method as claimed in claim 29 wherein said pretreated sewage waters are aerated in an inlet area arranged upstream of said stationary mineral bed.

31. A method as claimed in claim 18 which is further characterized to include the step of:
after passing said sewage waters through said sewage water pond of said first purification stage and prior to passing said pretreated sewage waters containing nitrate and residual ammonia, residual ammonia containing compounds or both into contact with said stationary mineral bed, passing said sewage waters through a sedimentation pond.

32. A method as claimed in claim 18 wherein said sewage waters are supplied to said sewage water pond of said first purification stage through grating means arranged upstream thereof.

* * * * *